United States Patent [19]
Dawe

[11] Patent Number: 4,882,829
[45] Date of Patent: Nov. 28, 1989

[54] DEVICE FOR ACCURATELY POSITIONING AND ALIGNING A GUIDE SLEEVE INTO A BORE OF A CYLINDER HEAD

[76] Inventor: Peter H. Dawe, 215 Springbrook, Sparta, N.J. 07871

[21] Appl. No.: 320,977

[22] Filed: Mar. 9, 1989

Related U.S. Application Data

[63] Continuation-in-part of Ser. No. 235,687, Aug. 23, 1988.

[51] Int. Cl.[4] .............................................. B23P 19/04
[52] U.S. Cl. ........................................ 29/251; 29/258; 29/263; 123/188 AA
[58] Field of Search .......... 29/251, 258, 263, 156.7 R, 29/156.7 A, 156.7 B, 156.7 C; 123/188 AA

[56] References Cited

U.S. PATENT DOCUMENTS 1,468,777 9/1923 Edwards ............................... 29/263
3,050,840 8/1962 Dunkerley ............................ 29/263
3,132,237 5/1964 Pribonic ...................... 29/156.7 R X

*Primary Examiner*—Mark Rosenbaum
*Assistant Examiner*—Frances Chin
*Attorney, Agent, or Firm*—Burgess, Ryan & Wayne

[57] ABSTRACT

A device for accurately positioning and automatically aligning correctly each guide sleeve within a bore of a cylinder head includes a base having a lower surface and an upper frustoconical aligning surface for accurately and automatically aligning a valve seat thereon during forcible insertion of a guide sleeve into the respective bore, the base having a bore extending therethrough; a guide rod extending through the bore of the base for insertion into a bore of the cylinder head for automatically and accurately guiding the guide sleeve which is force fit into the respective bore of the cylinder head, the guide rod having an enlarged head at a lower end thereof with a hexagonal outer surface, and outer screw threads at an upper end thereof; a driver cylinder slidably positioned on the guide rod above a guide sleeve to be positioned in a respective bore of the cylinder head; and a hex nut driver threadedly engaged with the upper end of the guide rod for driving the guide sleeve into the respective bore of the cylinder head, the hex nut driver including a hexagonal outer surface.

4 Claims, 3 Drawing Sheets

DEVICE FOR ACCURATELY POSITIONING AND ALIGNING A GUIDE SLEEVE INTO A BORE OF A CYLINDER HEAD

REFERENCE TO RELATED APPLICATION

This application is a continuation in part of U.S. patent application Ser. No. 07/235,687, filed Aug. 23, 1988 to Peter H. Dawe and entitled METHOD AND DEVICE FOR ACCURATELY POSITIONING AND ALIGNING A GUIDE SLEEVE INTO A BORE OF A CYLINDER HEAD.

BACKGROUND OF THE INVENTION

The present invention relates generally to automotive engines and, more particularly, is directed to a method and device for accurately positioning and aligning a guide sleeve into a bore of a cylinder head.

In conventional automotive engines, the intake and exhaust of gases into the respective cylinder chambers are controlled by valves. Specifically, each valve includes a valve head and a valve stem, with the valve stem slidable within a bore in the cylinder head and the valve head engagable with a valve seat at the entrance of the bore for opening and closing the intake and exhaust ports for the cylinder chamber. In such a case, a guide sleeve is conventionally inserted with a friction fit, into each bore so as to guide movement of the valve stem therein.

Conventionally, in order to insert a guide sleeve into a bore, the cylinder head is heated in an oven or by a torch and simultaneously, the guide sleeve is immersed into a solution of alcohol and dry ice to cool and thereby shrink the sleeve. The cooled guide sleeve is then forcibly inserted into the bore of the heated cylinder head by a press, a hammer, or other conventional means.

However, using such a method, it is impossible to accurately control alignment of the guide sleeve within the cylinder head. Thus, the guide sleeve is often not correctly aligned in the bore. Specifically, the axis of the guide sleeve will often be offset and/or inclined with respect to the axis of the bore in the cylinder head. The valve stem which slides within the guide sleeve will also be out of alignment with the bore in the cylinder head. This poor alignment of the valves will translate into deviations of 0.020 inch to 0.080 inch at the edge of a two inch diameter valve.

Because of such misalignment, the valve head will not accurately seat on the valve seat so that the suction and discharge ports for the cylinder chamber will not be completely closed at the respective times. It is therefore necessary to remove material from the valve seat in order to accurately position the valve head thereon. This removal operation is not only time consuming but alsto requires use of expensive equipment. For example, a carbide cutter with a pilot positioned by a new guide sleeve is used to remove the bulk of material. The next step requires the use of a rotary grinder to remove chatter marks caused by the carbide cutters. In the final step, the valve seat is lapped to achieve a perfect fit.

As a result of such time consuming operations, the time required to install, for example, 12 new valve guide sleeves according to the prior art, is approximately 3 to 4 hours, depending upon the degree of misalignment of each of the guide sleeves.

With the parent of the present application, namely, U.S. patent application Ser. No. 07/235,687, the entire disclosure of which is incorporated herein by reference, there is disclosed a method and apparatus for accurately positioning and aligning a guide sleeve into a bor eof a cylinder head that overcomes the aforementioned problems. Specifically, the invention described therein provides a tool having a hemispherical base and a guide rod secured to the hemispherical base. The hemispherical base includes a flat lower surface attached to a base plate, with a positioning surface which positions the tool on a support surface such as that of a press. The base plate is provided with a central opening which receives a screw to attach the base plate to the hemispherical base, via a threaded central opening in the base. The hemispherical base also includes an upper arcuate, hemispherical surface which functions as an upper aligning surface for aligning a valve seat thereon. In operation, a cylinder head, with a worn guide sleeve removed, is inverted and placed over the tool so that a valve seat seats on the hemispherical surface with the guide rod inserted through the bore. Thereafter, a new guide sleeve is positioned over the guide rod and a driver cylinder is placed over the guide sleeve, whereupon the guide sleeve is then forcibly inserted through the narrow section of the bore by a press. As a result, the valve seat will automatically align correctly on the hemispherical surface so as to accurately align the guide rod within the bore.

However, the above apparatus is still somewhat cumbersome since it requires the use of an arbor press.

OBJECTS AND SUMMARY OF THE INVENTION

Accordingly, it is an object of the present invention to provide a method and device for accurately positioning and automatically aligning correctly a guide sleeve within a bore of a cylinder head that overcomes the aforementioned problems characterizing the prior art.

It is another object of the present invention to provide a method and device for accurately positioning and aligning a guide sleeve within a bore of a cylinder head with a minimum of time.

It is still another object of the present invention to provide a method and device for accurately positioning and aligning a guide sleeve within a bore of a cylinder head so that any subsequent removal of matreial from the valve seat is kept to a minimum.

It is yet another object of the present invention to provide a method and device for accurately positioning and aligning a guide sleeve within a bore of a cylinder head in which the valve stem is accurately guided by the guide sleeve so that the valve head accurately seats on the valve seat.

It is a further object to the present invention to provide a method and device as described above which can be used with a pair of hand wrenches and thereby does not require use of an arbor press.

In accordance with an aspect of the present invention, for use with a cylinder head having a plurality of bores, a guide sleeve received tightly in each bore, a valve having a valve head and a valve stem insertable in each guide sleeve and a valve seat for seating each valve head, there is provided a device for accurately positioning and aligning each guide sleeve within a respective bore which includes a base having a lower surface and an upper inclined surface for accurately aligning a valve seat thereon during forcible insertion of a guide sleeve into the respective bore, the base having a bore extending therethrough; a guide rod extending through the bore of the base for insertion into a bore of the cylinder head for accurately guiding the guide sleeve which is force fit into the respective bore of the cylinder head, the guide rod having an enlarged head at a lower end thereof with a non-circular gripping surface, and screw threads at an upper end thereof; and driver means for driving the guide sleeve into the resepctive bore of the cylinder head, the driver means including screw threads which threadingly engage the screw threads of the guide rod, and a non-circular outer gripping surface.

In accordance with another aspect of the present invention, a method of inserting a guide sleeve into a bore of a cylinder head of the type having a valve seat associated with each bore and a valve having a valve head and a valve stem insertable through each guide sleeve, includes the steps of: positioning a guide rod having an enlarged head at a lower end thereof and screw threads at an upper end thereof through a bore of a base having a lower surface and an upper inclined aligning surface, such that the base is in contact with the enlarged head; placing the cylinder head over the guide rod such that a valve seat thereof is seated on the upper inclined aligning surface of the base and the guide rod is inserted through a respective bore corresponding to the valve seat; positioning the guide sleeve over the guide rod that protrudes above the cylinder head; threadedly securing driver means to the screw threads of the guide rod so as to force the guide sleeve along the guide rod into the respective bore with a friction fit, wherein the force applied to the guide sleeve is transmitted to the cylinder head so that the valve seat is automatically located on the upper inclined aligning surface and the guide sleeve is accurately aligned in the respective bore.

The above and other objects, features and advantages of the present invention will become readily apparent from the following detailed description thereof which is to be read in connection with the accompanying drawings. pdr

DETAILED DESCRIPTION OF A PREFERRED EMBODIMENT

Figure 1:
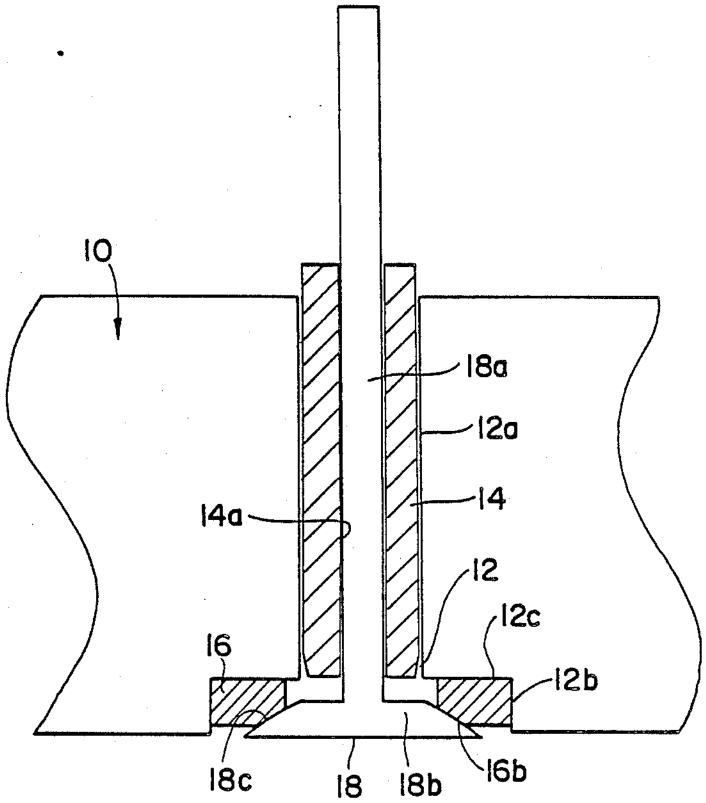
FIG. 1 is a cross-sectional view of a valve having a valve stem slidably inserted through a guide sleeve of a bore of a cylinder head and the valve head thereof seated on a valve seat.

Referring to the drawings in detail, and initially to FIG. 1, there is shown a cylinder head 10 having a bore 12 with a narrow section 12*a* having a first diameter and an upper entrance section 12*b* in communication with narrow section 12*a* and forming an annular shoulder 12*c* therebetween. A guide sleeve 14 is forcible fit into narrow section 12*a* of bore 12 and includes a central bore 14*a*. An annular valve seat 16 is positioned on annular shoulder 12*c* within upper entrance section 12*b* and includes an inner beveled annular surface 16b.

A valve 18 includes a valve stem 18*a* that is slidably positioned in central bore 14*a* of guide sleeve 14 for reciprocable movement therein, and a valve head 18*b* is connected at the upper stem of valve stem 18*a*. Valve head 18*b* has a lower beveled surface 18*c* which corresponds to beveled annular surface 16*b* of valve seat 16 so that valve head 18*b* seats on valve seat 16 to completely close the respective suction or discharge port (not shown) for the respective cylinder chamber.

The present invention is directed to the accurate positioning and aligning of guide sleve 14 within bore 12, without the necessity or removing large amounts of material from beveled annular surface 16*b* of valve seat 16 that is, to provide such accurate positioning and aligning of each guide sleeve 14 in bore 12 so that valve head 18*b* accurately seats on valve seat 16.

Figure 2:
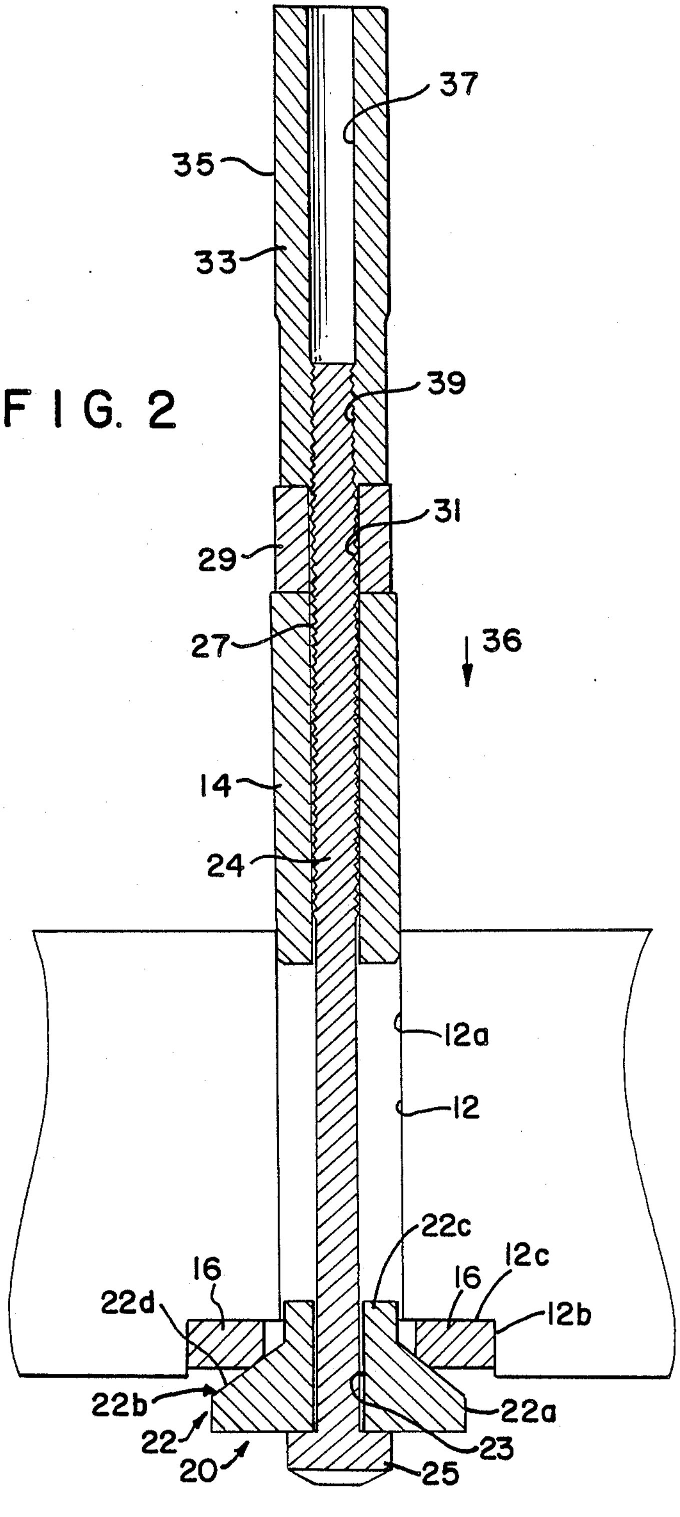
FIG. 2 is a cross-sectional view of a device and method for accurately positioning and aligning a guide sleeve within a bore of a cylinder head.
Figure 3:
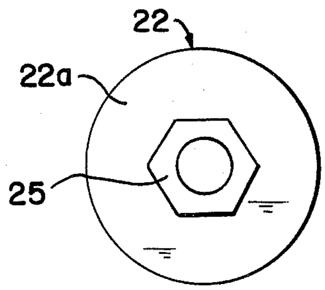
FIG. 3 is a top plan view of the device of FIG. 2.
Figure 4:
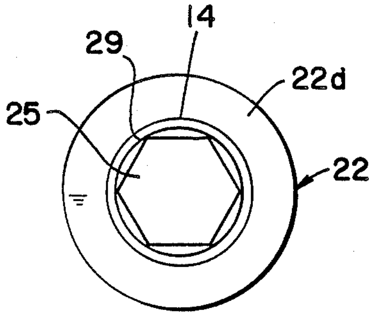
FIG. 4 is a bottom plan view of a device of FIG. 2.

Specifically, with reference to FIGS. 2–4, the present invention provides a tool 20 having a base 22. Specifically, base 22 includes a lower cylindrical section 22*a*, an intermediate frusto-conical section 22*b* integrally formed at the upper end of cylindrical section 22*a* and an upper cylindrical section 22*c* integrally formed at the upper end of the of frusto-conical section 22*b* and having a diamete rless than that of lower cylindrical section 22*a*. A central, axial bore 23 extends entirely through sections 22*a*–22*c* of base 22. The upper, exposed frusto-conical surface 22*d* of frusto-conical section 22*b* functions as an upper aligning surface for aligning a valve seat 16 thereon, as shown.

Tool 20 further includes a guide rod 24 with an enlarged head 25 thereon having a hexagonal or the like configuration. With this arrangement, guide rod 24 is insertable through bore 23 such that base 22 is slidable therealong, limited by enlarged head 25. Further, the upper approximately one half length of guide rod 24 has screw threads 27 therealong.

Tool 20 further includes a driver cylinder 29 having outer dimensions substantially equal to that of a new valve guide 14 to be inserted within bore 12 and having a central axial bore 31 extending therethrough which permits driver cylinder 29 to slide along guide rod 24.

Finally, tool 20 includes a hex nut driver 33 having an outer hexagonal gripping surface 35 and a central axial bore 37 therein. The lower end of bore 37 includes screw threads 39 such that hex nut driver 33 can be threadedly engaged with threads 27 of guide rod 24.

In operation, cylinder head 10, with a worn guide sleeve removed, is inverted and placed over tool 20 so that a valve seat 16 seats on frusto-conical surface 22*d* with guide rod 24 inserted through bore 12. In such case, guide rod 24 extends completely through bore 12 to a position above inverted cylinder head 10.

Thereafter, a new guide sleeve 14 is positioned over guide rod 24 and driver cylinder 29 is placed over guide rod 24 above guide sleeve 14. Then, hex nut driver 33 is threaded onto rod 24 and brought to bear against driver cylinder 29. Two hand wrenches are the used, one on enlarged head 25 and the other on hex nut driver 33, to provide the force required to insert the new valve guide 14, until valve guide 14 is seated. Specifically, during such force fit of guide sleeve 14 in the guide sleeve 14 within narrow section 12*a* of bore 12, the force applied along arrow 36 is transmitted also to cylinder head 10 and thereby to valve seat 16. As a result, valve seat 16 will automatically align correctly on hemispherical surface 22*b* so as to accuratey align guide rod 24 within bore 12. Accordingly, when guide sleeve 14 is completely inserted into narrow section 12*a* of bore 12, it is accurately positioned therein so that the axis thereof coincides with the axis of bore 12*a*. This means that a valve head 18*b* subsequently inserted through guide sleeve 14 will accurately seat on valve seat 16 without requiring any further machining of the valve seat.

Thus, with the present invention, there is no longer any necessity to cool guide sleeve 14, although this is certainly available as an alternative. With the present invention, cylinder head 10 is heated to approximately 250 degrees Fahrenheit using a hand torch, and the heated cylinder head 10 is placed over tool 20, as shown in FIG. 2. A new sleeve 14, driver cylinder 32 and hex nut driver 33, are placed over guide rod 24 of tool 20 that protrudes above cylinder head 10. While manually holding the assembly, the two wrenches are turned. The force required to press the guide sleeve 14 into position, as aforementioned, also holds valve seat 16 firmly against frusto-conical surface 22*d*, thereby automatically maintaining accurate alignment. All sleeves are installed in sequence while the cylinder head 10 is still hot. A minimal grinding operation is performed to verify propery insertion followed by a final lapping opertion to bring the valve into perfect registration with the existing valve seat 16.

The present invention provides the distinct advantage of controlled the accuracy of each sleeve installation while eliminatin the cutting so as to save time and eliminate the need to replace valve seats that have been cut away due to cutting and grinding operatiosn required to compensate for poorly aligned valve sleeves. Further, only 0.002″ to 0.008″ of material need be removed from a valve seat to accomplish an accurate fit. Thus, the total installation time for 12 guides is approximately 20 minutes as compared with 3 to 4 hours with prior art methods and devices. Further, it will be appreciated that the present invention does not require an arbor press as in the parent of the present application.

It will also be appreciated that the tool 20 according to the present invention may be adapted to install valve guides in a variety of four cycle internal combustion engines.

Having described this specific preferred embodiment of the invention with reference to the accompanying drawings, it will be appreciated that the present invention is not limited to that precise embodiment, and that various changes and modifications can be effected thereon by one of ordinary skill in the art without departing from the spirit or scope of the invention as defined by the appended claims.

What is claimed is:

1. For use with a cylinder head having a plurality of bores, a guide sleeve received tightly in each bore, a valve having a valve head and a valve stem insertable through each guide sleeve, and a valve seat for seating each valve head, a device for accurately positioning and automatically aligning correctly each guide sleeve within a respective bore, comprising:

(a) a base having a lower surface and an upper inclined aligning surface for accurately and automatically aligning said valve seat thereon during forcible insertion of said guide sleeve into the respective bore, said base having a bore extending therethrough;

(b) a guide rod extending through said bore of said base for insertion into a bore of the cylinder head for automatically and accurately guiding said guide sleeve which is force fit into the respective bore of the cylinder head, said guide rod having an enlarged head at a lower end thereof with a non-circular outer gripping surface, and screw threads at an upper end thereof; and (c) driver means for driving said guide sleeve into the respective bore of the cylinder head, said drive means including an internal bore with screw threads which threadedly engage the screw threads of the guide rod, and a non-circular outer gripping surface.

2. A device according to claim 1; wherein said upper inclined aligning surface is a frusto-conical surface.

3. A device according to claim 1; wherein at least one of said non-circular outer surfaces is a hexagonal surface.

4. A device according to claim 1; further including an annular driver cylinder slidably positioned on said rod between said guide sleeve and said driver means for driving said guide sleeve into the respective bore of the cylinder head upon threaded rotation of said driver means on said guide rod.

* * * * *

UNITED STATES PATENT AND TRADEMARK OFFICE

CERTIFICATE OF CORRECTION

PATENT NO. : 4,882,829

DATED : November 28, 1989

INVENTOR(S) : Peter H. Dawe

It is certified that error appears in the above-identified patent and that said Letters Patent is hereby corrected as shown below:

Column 2, line 3: change "bor eof" to --bore of--.

Column 3, line 39: delete "pdr".

Column 4, line 19: change "diamete rless" to --diameter less--.

line 56: after "the", insert --direction of arrow 36, and because of the tight friction fit of--.

Signed and Sealed this

Twenty-seventh Day of August, 1991

Attest:

HARRY F. MANBECK, JR.

Attesting Officer

Commissioner of Patents and Trademarks